(12) United States Patent
Hashimoto

(10) Patent No.: US 6,377,432 B1
(45) Date of Patent: Apr. 23, 2002

(54) FUSE AND BATTERY PACK CONTAINING THE FUSE

(75) Inventor: Hisashi Hashimoto, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/512,332

(22) Filed: Feb. 24, 2000

(30) Foreign Application Priority Data

Feb. 26, 1999 (JP) ............................................. 11-049895
Jun. 2, 1999 (JP) ............................................. 11-154714

(51) Int. Cl.[7] ................................................. H02H 5/04
(52) U.S. Cl. ....................................... 361/104; 361/103
(58) Field of Search ................................. 361/104, 103, 361/105; 337/5, 16, 295, 296

(56) References Cited

U.S. PATENT DOCUMENTS 5,247,273 A * 9/1993 Shibayama et al. ............ 337/16
5,497,286 A * 3/1996 Shimada et al. ............. 361/105
5,644,282 A * 7/1997 Mehta et al. ................. 337/295
5,998,043 A * 12/1999 Sasaki et al. ................ 428/627
6,034,589 A1 * 3/2001 Montgomery et al. ....... 337/296

FOREIGN PATENT DOCUMENTS

JP 55-141448 10/1980
JP 7-29481 1/1995
JP 7-114101 12/1995

* cited by examiner

Primary Examiner—Peter S. Wong
Assistant Examiner—Lawrence Luk
(74) Attorney, Agent, or Firm—Wenderoth, Lind & Ponack, L.L.P.

(57) ABSTRACT

A fuse is melted and cut off when an overcurrent flows through the fuse. The fuse has a different thermal expansion coefficient metal laminate obtained by laminating a plurality of different thermal expansion coefficient metal plates. When the fuse is melted and cut off by heat of the overcurrent, a mechanical deforming force is applied to a melting portion of the fuse. The mechanical force is caused by the difference between thermal expansion coefficients of the different thermal expansion coefficient metal plates.

10 Claims, 4 Drawing Sheets

FUSE AND BATTERY PACK CONTAINING THE FUSE

This application is based on applications No. 11-49895 filed in Japan on Feb. 26, 1999 and No. 11-154714 filed in Japan on Jun. 2, 1999, the content of which incorporated hereinto by reference.

BACKGROUND OF THE INVENTION

This Invention relates to a fuse melted and cut off by heat when overcurrent flows and a battery pack containing the fuse.

A fuse is melted and cut off by heat when overcurrent flows, and thereby it interrupts current. A fuse is heated by Joule heat. Joule heat increases in proportion to the product of the square of current and resistance of the fuse. Therefore, when current becomes large, Joule heat abruptly increases and a fuse is heated to a high temperature. A fuse is melted at a predetermined temperature which is decided by the kind of the metal used for the fuse. Therefore a fuse is melted and cut off by heat when predetermined current flows and thereby current is interrupted.

It is important that a fuse melted and cut off by predetermined current can be rapidly melted and cut off and can surely interrupt current when current becomes a predetermined value. Further, it is also important that a fuse, after melted and cut off, can be kept in separated state and can continuously interrupt current. Fuses have been developed in which a spring member is used so as to surely interrupt current after a fuse is melted and cut off. Such fuses are disclosed, for example, in Japanese Patent Publication No. 114101 of 1995 and Japanese Non-examined Patent Publication NO. 29481 of 1995. In fuses disclosed in the above-mentioned Publications, a spring member is connected in an elastically deformed state by means of a conductive substance of low melting point such as a solder. For example, as shown in FIG. 1, one end of a spring member 6 constituting a fuse is connected to a terminal 8 by means of a solder 7, in this Figure, when a conductive substance of low melting point such as a solder is melted by overcurrent, and the conductive substance becomes unable to connect the fuse comprising the spring member 6 in the elastically deformed state, so that as shown in FIG. 2, one end of the spring member 6 is separated from the terminal 8.

As shown in FIG. 1, a fuse comprising a spring member is not re-connected in current interrupting state. Therefore, such a fuse has an advantage that it can keep current interrupting state. However, since a fuse having this structure is melted and cut off at a portion connected to a terminal, the terminal and the spring member need to be fixed to a predetermined position. And whole of such a fuse becomes large in size, and it has a difficulty in being conveniently fitted to a narrow position. Further, in a fuse having this structure, since a conductive substance of low melting point such as a solder is melted to interrupt current, it is difficult to precisely set the value of current to be interrupted. It is very important for a fuse to precisely set the value of current to be interrupted. In a fuse having this structure, temperature and current at which a solder is melted change according to welding condition of the solder to a terminal such as amount of the solder. This makes it difficult to precisely set the value of current to be interrupted, which is hereinafter referred to as "interruption current". Further, it is difficult to widely change melting temperature of a solder, in other words, widely change interruption current. It is especially difficult to make interruption current small. It is because, by reducing the amount of solder used for connecting a spring member to a terminal so as to make interruption current small, the spring member cannot be surely connected to the terminal.

The present invention has been developed in order to solve the abovementioned problems of the prior art. An important object of the present invention is to provide a fuse capable of precisely setting interruption current, of widely changing interruption current and further of being rapidly melted and cut off by interruption current and thereby interrupting current, and to provide a battery pack containing such a fuse.

Another important object of the present invention is to provide a fuse of a compact size which is conveniently applicable to a variety of uses.

The above and further objects of the present invention will more fully be apparent from the following detailed description given with accompanying drawings.

SUMMARY OF INVENTION

A fuse according to the present invention is a fuse melted and cut off by overcurrent, and it comprises a different thermal expansion coefficient metal laminate in which a plurality of metal plates of different thermal expansion coefficients are laminated. When a fuse is heated by overcurrent and thereby melted and cut off, a mechanical deforming force is applied to a melting portion of the fuse, which force being caused by difference between the thermal expansion coefficients of the laminated metals. In this specification, the word "different thermal expansion coefficient metal laminate" means a laminate in which a plurality of different thermal expansion coefficient metal plates are laminated, and is used in wide meaning as including a bimetal in which two kinds of metal plates are laminated, a trimetal in which three kinds of metal plates are laminated, and a laminate in which more than four kinds of metal plates are laminated.

A fuse having this structure is advantageous in that it can precisely set interruption current, can widely change interruption current and further, can be rapidly melted and cut off by interruption current to interrupt current. It is because, when such fuse is heated by overcurrent and thereby melted and cut off, a mechanical deforming force is applied to melted portion, which force is caused by difference between the thermal expansion coefficients of the metal plates constituting a different thermal expansion coefficient metal laminate. When a different thermal expansion coefficient metal laminate is heated by overcurrent, different amount of deformation is generated through the laminate, which causes a mechanical deforming force to be applied to a melting portion of the fuse. With this mechanical deforming force, a fuse is precisely and rapidly melted and cut off at the melting portion. Therefore, a fuse having this structure can realize advantages of precisely setting interruption current, of widely changing interruption current, and further, of rapidly being melted and cut off by interruption current to interrupt current. Further, a fuse having this structure has an advantage of surely cutting off melted portion to interrupt current, since the melting portion of the fuse is thermally mechanically deformed and cut off by means of a different thermal expansion coefficient metal laminate.

Furthermore, unlike a conventional fuse, a fuse having this structure is not melted and cut off at a portion connected to a terminal, but is cut off at the melting portion to which a mechanical deforming force is applied by difference between thermal expansion coefficients of the metal plates constituting the different thermal expansion coefficient metal laminate, so that the whole of a fuse need not be large in size, and it can be conveniently fitted to a narrow portion. In other words, the whole of a fuse having this structure can be formed compact in size and conveniently applied to a variety of uses.

A fuse according to the present invention may comprise, for example, NI—Fe as a low thermal expansion coefficient metal and Cu—Ni—Mn as a high thermal expansion coefficient metal.

Further, a fuse according to the present invention can be rapidly melted and cut off when current becomes set value, with volume resistivity of the different thermal expansion metal laminate being 100~150 μΩ·cm.

Furthermore, a fuse according to the present invention is preferably has such a shape that the different thermal expansion coefficient metal laminate is wide at opposite end portions thereof and narrow at a middle melting portion.

A fuse according to the present invention is suitable for use in a battery pack. In this battery pack, a fuse melted and cut off by overcurrent is connected in series to a battery. The fuse comprises a different thermal expansion coefficient metal laminate in which a plurality of different thermal expansion coefficient metal plates are laminated, and when the fuse is melted and cut off by heat, a deforming force is applied to a melting portion, which force being caused by difference between thermal expansion coefficients of the metal plates.

A battery pack having this structure can rapidly melt and cut off a fuse and thereby can interrupt current when the battery pack is used in abnormal state. It is because a fuse connected in series to the battery comprises a different thermal expansion coefficient metal laminate in which a plurality of different thermal expansion coefficient metal plates are laminated.

In a battery pack according to the invention, a plurality of batteries can be connected in series by means of fuses. In such a battery pack, fuses each comprising a different thermal expansion coefficient metal laminate are connected to terminal electrodes of batteries arranged in parallel to each other. Fuses each comprising a different thermal expansion coefficient metal laminate are preferably connected to batteries in such a manner that, when melted and cut off by heat, the melting portion is separated from a terminal electrode of the battery, that is, it is deformed in the direction opposite to the battery.

A battery pack having this structure has an advantage that, since a melting portion of a fuse melted and cut off by overcurrent is deformed in the direction separated from a battery, the melted fuse can be prevented from attaching to the battery, thereby affording to surely interrupt current and safely use the battery pack.

DETAILED DESCRIPTION OF THE INVENTION

Figure 1:
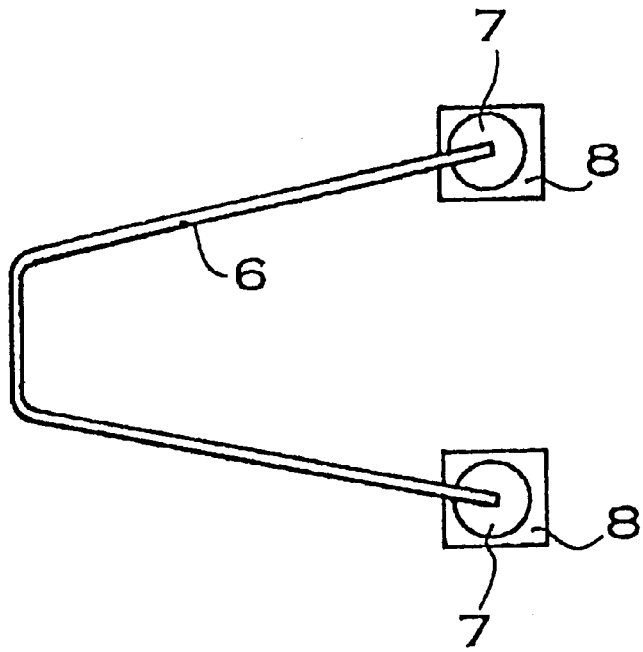
FIG. 1 is a plan view illustrating a conventional fuse fixed to terminals.
Figure 2:
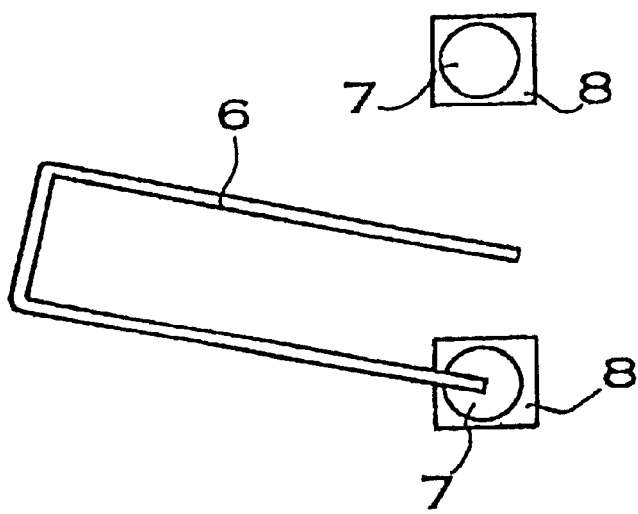
FIG. 2 is a plan view of a fuse shown in FIG. 1 in current interrupting state.
Figure 3:
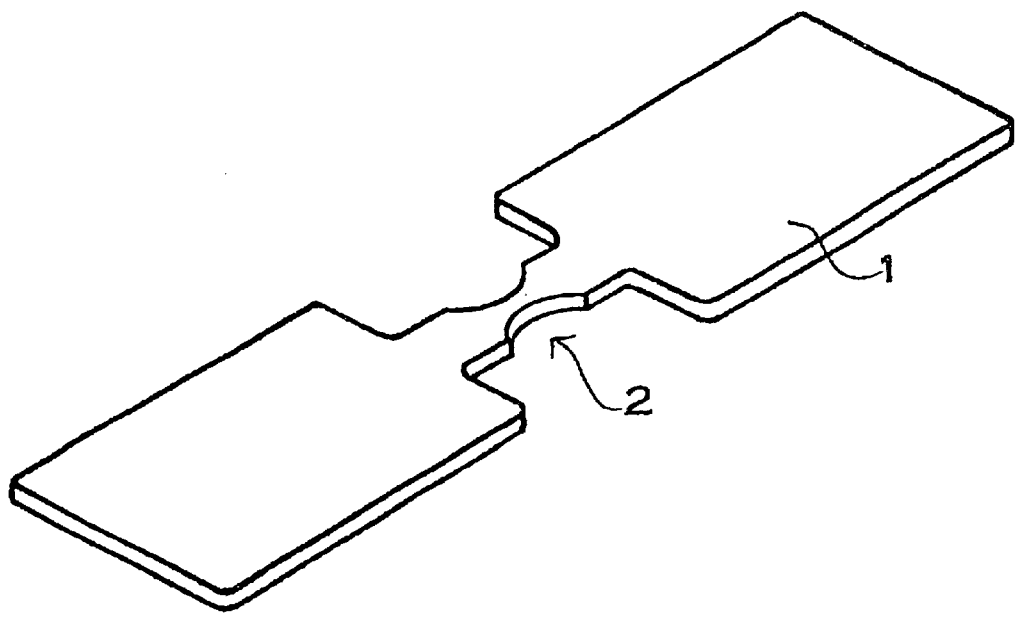
FIG. 3 is a perspective view of a fuse of an embodiment of the present invention.

A fuse shown in FIG. 3 is obtained by cutting into a long and narrow shape a different thermal expansion coefficient metal laminate 1 in which a plurality of metal plates having different thermal expansion coefficients are laminated. A fuse shown in this Figure has a shape being wide in its opposite end portions and narrow in a middle melting portion 2. By narrowing the melting portion 2 of a fuse, the interruption current can be reduced. The interruption current can also be reduced by elongating the melting portion 2. A fuse is connected at the wide end potions.

Figure 4:
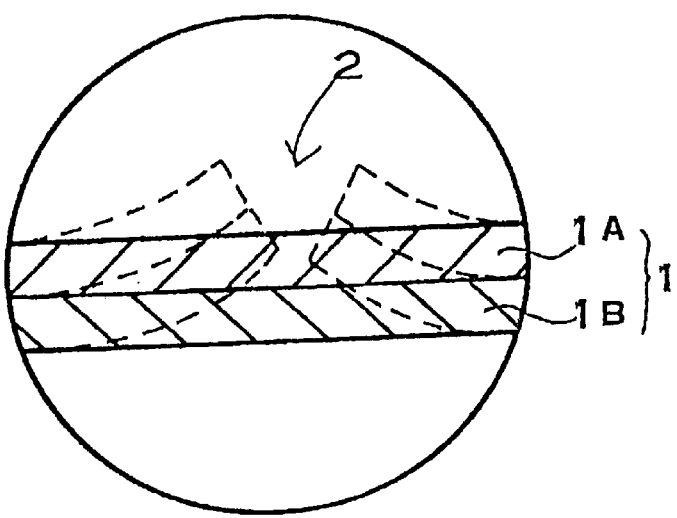
FIG. 4 is an enlarged sectional view of the fuse shown in FIG. 3.

As shown in an enlarged sectional view of FIG. 4, a different thermal expansion coefficient metal laminate 1 is a compound metal plate in which a low thermal expansion coefficient metal plate 1A and a high thermal expansion coefficient metal plate 1B are laminated and joined together. As a low thermal expansion coefficient metal plate 1A, a metal plate of a Ni—Fe alloy, a Cr—Fe alloy, a Ni—Cr—Fe alloy or the like is used. And as a high thermal expansion coefficient metal plate 1B, a metal plate of a Cu—Ni—Mn alloy, a Fe—Ni—Cr alloy, a Fe—Ni—Mo alloy, a Ni—Cu alloy, a Fe—Ni—Mn alloy, a Zn—Cu alloy or the like is used.

A fuse comprising a different thermal expansion coefficient metal laminate with volume resistivity of 100~150 μΩ·cm has an advantage of being rapidly melted and cut off. As a different thermal expansion coefficient metal laminate with volume resistivity in the abovementioned range, a metal laminate comprising a low thermal expansion coefficient metal plate of a Ni—Fe alloy and a high thermal expansion coefficient metal plate of a Cu—Ni—Mn alloy can be used. Volume resistivity of this different thermal expansion coefficient metal laminate is 110~140 μΩ·cm. Further, as a different thermal expansion coefficient metal laminate comprising a low thermal expansion coefficient metal plate, a high thermal expansion coefficient metal plate and a thin copper plate sandwiched therebetween, a bimetal comprising a low thermal expansion coefficient metal plate of a Ni—Fe alloy, a high thermal expansion coefficient metal plate of a Ni—Cu alloy, and a thin copper plate of a Cu—Ni—Mn alloy can be used. Volume resistivity of this bimetal is 100~135 μΩ·cm.

A different thermal expansion coefficient metal laminate used for a fuse according to the present invention is, however, not limited to the abovementioned materials. As a different thermal expansion coefficient metal laminate comprising a low thermal expansion coefficient metal plate and a high thermal expansion coefficient metal plate joined together, all of the thermally deformable metals can be used. For example, a low thermal expansion coefficient metal plate of a Ni—Fe alloy and a high thermal expansion coefficient metal plate of a Zn—Cu alloy, a Fe—Ni—Mn alloy, Ni, a Fe—Ni—Cr alloy, a Fe—Ni—Mo alloy or a Cu—Ni—Mn alloy, or a low thermal expansion coefficient metal plate of a CR—Fe alloy and a high thermal expansion coefficient metal plate of a Fe—Ni—Cr alloy or the like can be used.

EMBODIMENT 1

Figure 5:
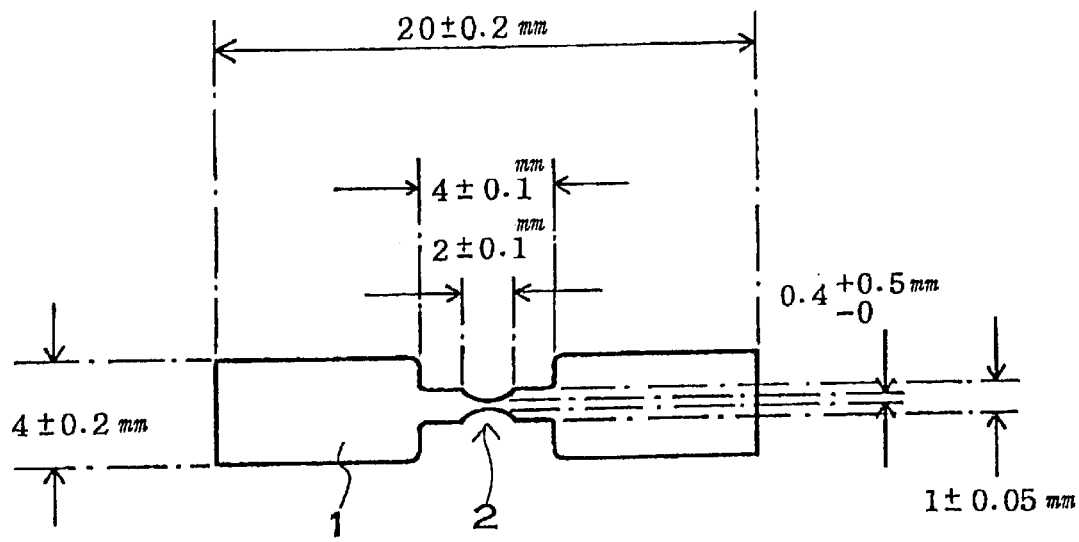
FIG. 5 is a plan view of the fuse shown in FIG. 3.

A fuse of the size shown in FIG. 5 was manufactured by way of trial. A different thermal expansion coefficient metal laminate 1 used for the fuse comprised a low thermal expansion coefficient metal plate of a Ni—Fe alloy and a high thermal expansion coefficient metal plate of a Cu—Ni—Mn alloy. Volume resistivity of this different thermal expansion metal laminate 1 was 110 $\mu\Omega$·cm.

EXAMPLE 1

A fuse was manufactured by way of trial similarly to EMBODIMENT 1 except that a Mn—Ni—Cr alloy was used instead of a different thermal expansion coefficient metal laminate. Volume resistivity of this alloy was 120 $\mu\Omega$·cm.

EXAMPLE 2

A fuse was manufactured by way of trial similarly to EMBODIMENT 1 except that a SUS304 stainless plate was used instead of a different thermal expansion coefficient metal laminate. Volume resistivity of this stainless plate was 85 $\mu\Omega$·cm.

EXAMPLE 3

A fuse was manufactured by way of trial similarly to EMBODIMENT 1 except that a Fe—Ni alloy plate was used instead of a different thermal expansion coefficient metal laminate. Volume resistivity of this alloy plate was 64 $\mu\Omega$·cm.

EXAMPLE 4

A fuse was manufactured by way of trial similarly to EMBODIMENT 1 except that a Fe plate was used instead of a different thermal expansion coefficient metal laminate. Volume resistivity of this Fe plate was 8 $\mu\Omega$·cm.

Currents and times required for cutting off by melting the fuses of EMBODIMENT 1 and EXAMPLES 1 to 4 were measured and shown in Table 1.

comprising a Fe plate of EXAMPLE 4 was not cut off by melting by 10 A current, but was melted and cut off after as long as 150 seconds by 15 A current. These data apparently prove that a fuse according to the present invention can be melted and cut off in an extremely short time, though volume resistivity of this fuse is smaller than that of the metal used for a fuse of EXAMPLE 2. Further, since a melting portion 2 of a fuse according to the present invention is thermally mechanically deformed by means of a different thermal expansion coefficient metal laminate 1 and is melted and cut off, the fuse is surely cut off as shown by chain line in FIG. 4 at the moment when melted and thereby current is interrupted.

Figure 6:
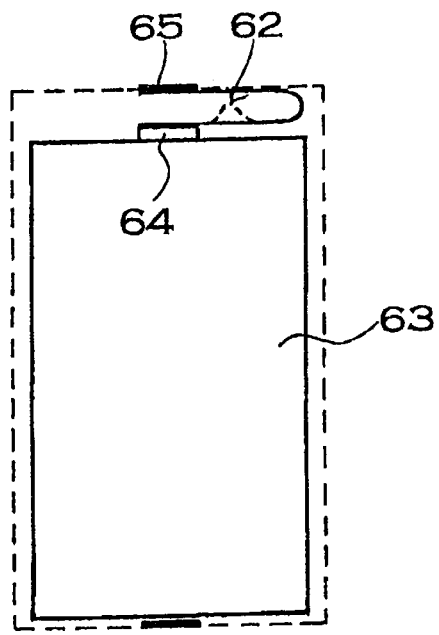
FIG. 6 is a sectional view of a battery pack of an embodiment of the present invention in which a fuse of the present invention is contained.

When a fuse according to the present invention is melted and cut off, a melting portion 2 is mechanically deformed. A fuse according to the present invention is contained in a battery pack in such a manner that a melting portion 62, when melted, is deformed so as to be separated from a battery 63 as shown in FIG. 6. in a battery pack of this Figure, one end of a fuse is connected to a terminal electrode 64 of the battery 63 with the other end connected to a terminal plate 65. When overcurrent is carried to the battery 63, the fuse is melted and cut off. The melting portion 62 of the fuse is so disposed as to be upwardly bent in this Figure and separated from the battery 63 when melted. Therefore, in this Figure, the upper face of the melting portion 62 comprises a low thermal expansion coefficient metal plate, with the lower face thereof comprising a high thermal expansion coefficient metal plate.

Figure 7:
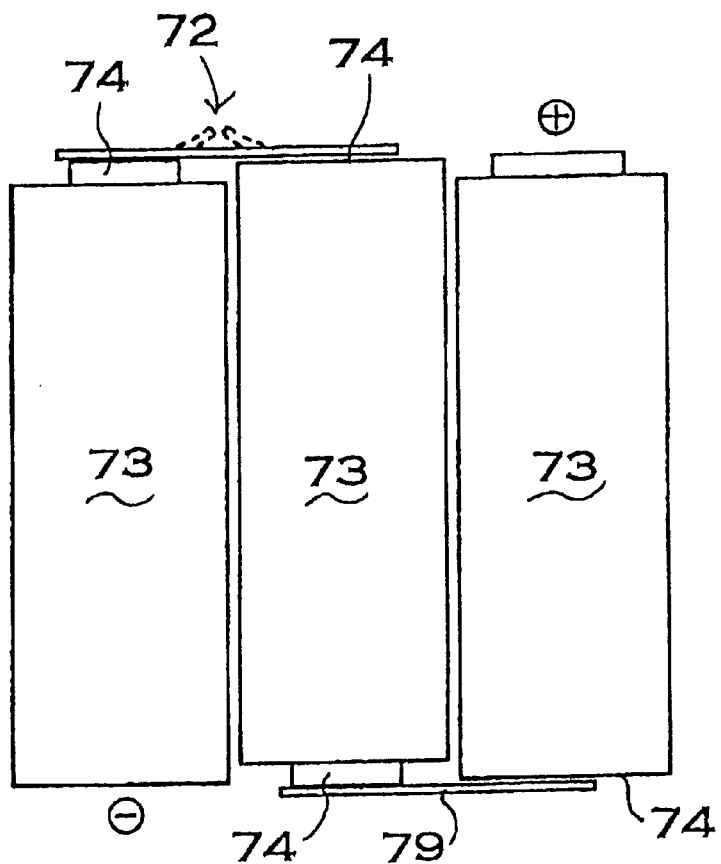
FIG. 7 is a front view of a battery pack of another embodiment of the present invention illustrating connection of batteries.
Figure 8:
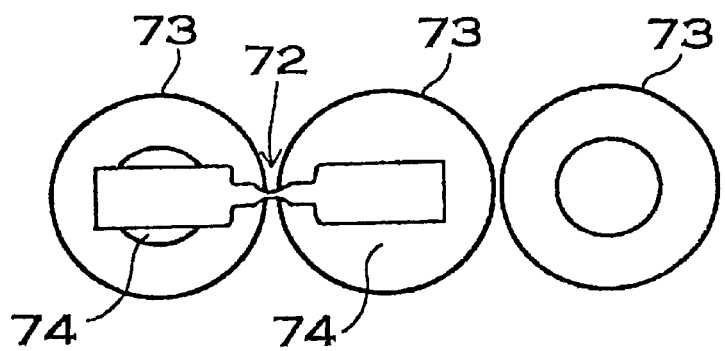
FIG. 8 is a plan view of the battery pack shown in FIG. 7 illustrating connection of batteries.

Further, in a battery pack shown in FIGS. 7 and 8, adjacently arranged batteries 73 are connected in series by fuses and housed in a plastic case (not shown), or connected by means of a thermally contractible film. In this battery pack, both ends of each fuse are spot-welded to terminal electrodes 74 of two batteries 74 adjacently-arranged in parallel respectively. Each fuse comprises the abovementioned different thermal expansion coefficient metal laminate

TABLE 1

| SAMPLE | EMBODIMENT 1 | EXAMPLE 1 | EXAMPLE 2 | EXAMPLE 3 | EXAMPLE 4 |
|---|---|---|---|---|---|
| METAL | BIMETAL | Mn – Ni – Cr ALLOY | SUS304 | Fe + Ni ALLOY | Fe |
| VOLUME RESISTIVITY ($\mu\Omega$ · CM) | 110 | 120 | 85 | 64 | 8 |
| CURRENT | | | | | |
| 3A | | | | | |
| 4A | | | | | |
| 5A | 35 SEC. | — | — | — | — |
| 6A | 2.8 SEC. | — | — | — | — |
| 7A | 1.3 SEC. | 30.0 SEC. | — | — | — |
| 8A | 0.7 SEC. | 2.6 SEC. | 5.5 SEC. | — | — |
| 9A | | 1.3 SEC. | 1.0 SEC. | 20.0 SEC. | — |
| 10A | | | 0.8 SEC. | 1.0 SEC. | — |
| 15A | | | | 0.7 SEC. | 150 SEC. |
| 20A | | | | | 0.8 SEC. |

As shown in Table 1, the fuse of EMBODIMENT 1 of the present invention was cut off by melting after 35 seconds by 5 A current, 2.8 seconds by 6 A current, 1.3 seconds by 7 A current, and 0.7 seconds by 8 A current. On the other hand, the fuse of EXAMPLE 1 was melted and cut off after as long as 30 seconds by 7 A current. Further, the fuse comprising a stainless plate of EXAMPLE 2 was not cut off by melting by 7 A current, but was cut off by melting after as long as 5.5 seconds by 8 A current, The fuse of EXAMPLE 3 was not melted and cut off by 8 A current, but was melted and cut off after as long as 20 seconds by 9 A current. The fuse and is melted and cut off by heat when overcurrent is carried to a battery 73. The different thermal expansion coefficient metal laminate is connected to the batteries 73 in such a manner that a melting portion 72, when melted and cut off by heat, is separated from a terminal electrode 74, that is, is deformed in a direction opposite to the terminal electrode 74 of the battery 73 as shown with chain line in FIG. 7. This is realized for the purpose of preventing the melting portion 72 from attaching to the terminal electrode 74 of the battery 74. In order to deform the melting portion 72 into such a shape, the upper face of the different thermal expansion coefficient metal laminate constituting the fuse shown in this Figure comprises a low thermal expansion coefficient metal plate, with the lower face thereof comprising a high thermal expansion coefficient metal plate.

In the battery pack shown in FIG. 7, upper ends of two batteries 73 calculated from the left are connected in series by a fuse comprising a different thermal expansion coefficient metal laminate, and lower ends of two batteries 73 calculated from the right are connected, not by a fuse, but by a conductive lead plate 79. As an electrically conductive lead plate 79, for example, a nickel plate or a metal plate obtained by nickel-plating or chromium-plating surface of an iron plate, a copper plate, a brass plate or the like. In a battery pack containing more than three batteries, though not shown, all the batteries can be connected in series by fuses each comprising a different thermal expansion coefficient metal laminate. Further, more than four batteries can be connected in series by a plurality of fuses and lead plates.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. A battery pack comprising:

a plurality of batteries having terminal electrodes, said batteries being arranged parallel to each other; and a plurality of fuses connecting said batteries in series via said terminal electrodes, each of said fuses comprising a laminate comprising a plurality of metal plates having different thermal expansion coefficients laminated together, wherein said metal plates have melting portions which are melted and cut off when an overcurrent flows through said fuse, and wherein said fuses are connect to said terminal electrodes such that when said fuses are melted and cut off by heat generated by the overflow current, a mechanical deforming force caused by the different thermal expansion coefficients of said metal plates is applied to said melted portions of said fuses such that said melting portions of said fuses are deformed in a direction away from said batteries so as to be separated from said batteries.

2. A battery pack according to claim 1, wherein said laminate is one of a bimetal comprising two types of metal plates laminated together, a trimetal comprising three types of metal plates laminated together, and a multimetal comprising more than four types of metal plates laminated together.

3. A battery pack according to claim 1, wherein one of said metal plates of said laminate is a low thermal expansion coefficient metal plate selected from a group of metal plates consisting of a Ni—Fe alloy plate, a Cr—Fe alloy plate, a Ni—Cr—Fe alloy plate and other metal plates.

4. A battery pack according to claim 1, wherein one of said metal plates of said laminate is a low thermal expansion coefficient metal plate of a Ni—Cu alloy, and another one of said metal plates of said laminate a high thermal expansion coefficient metal plate selected from a group of metal plates consisting of a Zn—Cu alloy plate, a Fe—Ni—Mn alloy plate, a Ni plate, a Fe—Ni—Cr alloy plate, a Fe—Ni—Mo alloy plate, and a Cu—Ni—Mn alloy plate.

5. A battery pack according to claim 3, wherein said low thermal expansion coefficient metal plate is a Cr—Fe alloy plate, and another one of said metal plates of said laminate is a high thermal expansion coefficient metal plate of a Fe—Ni—Cr alloy.

6. A battery pack according to claim 1, wherein one of said metal plates of said laminate is a high thermal expansion coefficient metal plate selected from a group of metal plates consisting of a Cu—Ni—Mn alloy plate, Fe—Ni—Cr alloy plate, a Fe—Ni—Mo alloy plates, a Ni—Cu alloy plate, a Fe—Ni—Mn alloy plate, a Zn—Cu alloy plate and other metal plates.

7. A battery pack according to claim 1, wherein said laminate has a volume resistivity of 100~150 $\mu\psi$·cm.

8. A battery pack according to claim 7, wherein one of said metal plates of said laminate is a low thermal expansion coefficient plate of a Ni—Fe alloy, and another one of said metal plates of said laminate is a high thermal expansion coefficient plate of a Cu—Ni—Mn alloy.

9. A battery pack according to claim 7, wherein one of said metal plates of said laminate is a low thermal expansion coefficient plate of a Ni—Fe alloy, and another one of said metal plates of said laminate is a high thermal expansion coefficient plate of a Ni—Cu alloy, and wherein said laminate further comprises a thin copper plate of a Cu—Ni—Mn alloy sandwiched between said low thermal expansion coefficient plate and said high thermal expansion coefficient plate.

10. A battery pack according to claim 1, wherein each of said fuses is shaped such that opposite end potions on opposite sides of said melting portion are wider than said melting portion.

* * * * *